United States Patent
Ikebata et al.

(10) Patent No.: US 9,116,483 B2
(45) Date of Patent: Aug. 25, 2015

(54) IMAGE FORMING APPARATUS WITH DYNAMIC JOB EXECUTION

(71) Applicant: KYOCERA Document Solutions Inc., Osaka-shi, Osaka (JP)

(72) Inventors: Yoshiaki Ikebata, Osaka (JP); Ryusuke Nakatani, Osaka (JP); Yumi Hirobe, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/254,722

(22) Filed: Apr. 16, 2014

(65) Prior Publication Data

US 2014/0320904 A1    Oct. 30, 2014

(30) Foreign Application Priority Data

Apr. 25, 2013  (JP) .................................. 2013-092889

(51) Int. Cl.
*G06F 3/12* (2006.01)
*G03G 15/00* (2006.01)
*H04N 1/00* (2006.01)

(52) U.S. Cl.
CPC ................. *G03G 15/50* (2013.01); *H04N 1/00* (2013.01); *G03G 2215/00949* (2013.01)

(58) Field of Classification Search
CPC .......... H04N 1/00209; H04N 1/00628; H04N 1/00912; H04N 1/12; H04N 1/193; H04N 1/2369

USPC ......................................... 358/1.13, 1.1, 1.15
See application file for complete search history.

(56) References Cited

U.S. PATENT DOCUMENTS

2007/0292183 A1*  12/2007  Moriyama et al. ............ 399/407
2008/0151330 A1*   6/2008  Takahata ....................... 358/497

FOREIGN PATENT DOCUMENTS

JP          2004167798 A       6/2004

* cited by examiner

*Primary Examiner* — Martin Mushambo
(74) *Attorney, Agent, or Firm* — Alleman Hall McCoy Russell & Tuttle LLP

(57) ABSTRACT

An image forming apparatus includes a job execution portion, an operation portion, and a storage portion. The job execution portion executes a job. The operation portion receives an operation of selecting a setting item used in a job to be executed, an operation of setting a setting value of a job to be executed, and an execution instruction for a job. The storage portion stores a content of a specific operation of making the operation portion into a state where a plurality of touch operations have been performed by one touch operation. The job execution portion makes a job execution speed different between a job for which the specific operation has been performed on the operation portion during setting operation, and a job set by only a normal operation without the specific operation during setting operation on the operation portion.

12 Claims, 15 Drawing Sheets

FIG. 12

| | | 31,32 |
|---|---|---|
| READY TO COPY (FULL COLOR). | | |
| FUNCTION LIST | | |
| FILE FORMAT | PDF | ∧ |
| DOCUMENT SIZE | AUTOMATIC | —77 |
| DOCUMENT SETTING ORIENTATION | TOP EDGE ON TOP | 1/6 |
| MIXED DOCUMENT SIZE | NOT SET | ∨ |
| CANCEL | < BACK   NEXT > | REGISTER |

K13

IMAGE FORMING APPARATUS WITH DYNAMIC JOB EXECUTION

INCORPORATION BY REFERENCE

This application is based upon and claims the benefit of priority from the corresponding Japanese Patent Application No. 2013-092889 filed on Apr. 25, 2013, the entire contents of which are incorporated herein by reference.

BACKGROUND

The present disclosure relates to an image forming apparatus capable of changing the execution speed of a job, which includes an operation portion that receives setting of a job.

In image forming apparatuses such as a copy machine, a multifunction peripheral, a printer, and a FAX apparatus, sound occurs upon job execution. If too large sound occurs from the image forming apparatus, the sound becomes noise to make a user uncomfortable. The magnitude of sound occurring upon job execution may be one of consideration factors for introducing a new image forming apparatus. Therefore, it is preferable that sound occurring from the image forming apparatus upon job execution is as small as possible. There is known a technique having a configuration for reducing sound occurring from the image forming apparatus.

Specifically, there is known an image forming apparatus capable of conveying a recording sheet from a recording sheet accommodating portion to an image recording portion at two or more kinds of different conveyance speeds and recording an image. The image forming apparatus has a silent mode for performing a recording operation more silently than in a normal case, and in response to selection of the silent mode by a switching portion (switch 25 for silent mode), selects a slower conveyance speed than in a normal case among the different conveyance speeds, to perform recording. In addition, there is known another image forming apparatus for performing a reading operation of reading a document, conveying a recording sheet from a recording sheet accommodating portion to an image recording portion, and recording the read image. The image forming apparatus has a silent mode for performing a recording operation more silently than in a normal case. In a normal case, the image forming apparatus starts conveyance of the recording sheet and performs recording before a reading operation is completed. On the other hand, in response to selection of the silent mode, the image forming apparatus starts conveyance of the recording sheet and performs recording after a reading operation is completed. This configuration can reduce noise of driving sound in accordance with an operation on a switching portion (silent reading mode switch 25 or the like) for operation sound reduction.

SUMMARY

An image forming apparatus according to the present disclosure includes a job execution portion, an operation portion, and a storage portion. The job execution portion executes a job. The operation portion receives an operation of selecting a setting item used in a job to be executed, an operation of setting a setting value of a job to be executed, and an execution instruction for a job. The storage portion stores a content of a specific operation of making the operation portion into a state where a plurality of touch operations have been performed by one touch operation. The job execution portion makes a job execution speed different between a job for which the specific operation has been performed on the operation portion during setting operation, and a job set by only a normal operation without the specific operation during setting operation on the operation portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 12 is a diagram showing an edit registration screen for program of the multifunction peripheral according to the embodiment of the present disclosure.

DETAILED DESCRIPTION

Hereinafter, an embodiment of the present disclosure will be described with reference to FIGS. 1 to 15. In the following description, a multifunction peripheral 100 (example of image forming apparatus) including a document reading portion 1 (example of job execution portion) and a printing portion 2 (example of job execution portion) will be taken as an example. It is noted that elements such as a configuration and placement described in the present embodiment do not limit the scope of disclosure but are merely examples for explanation.

(Summary of Image Forming Apparatus)

Figure 1:
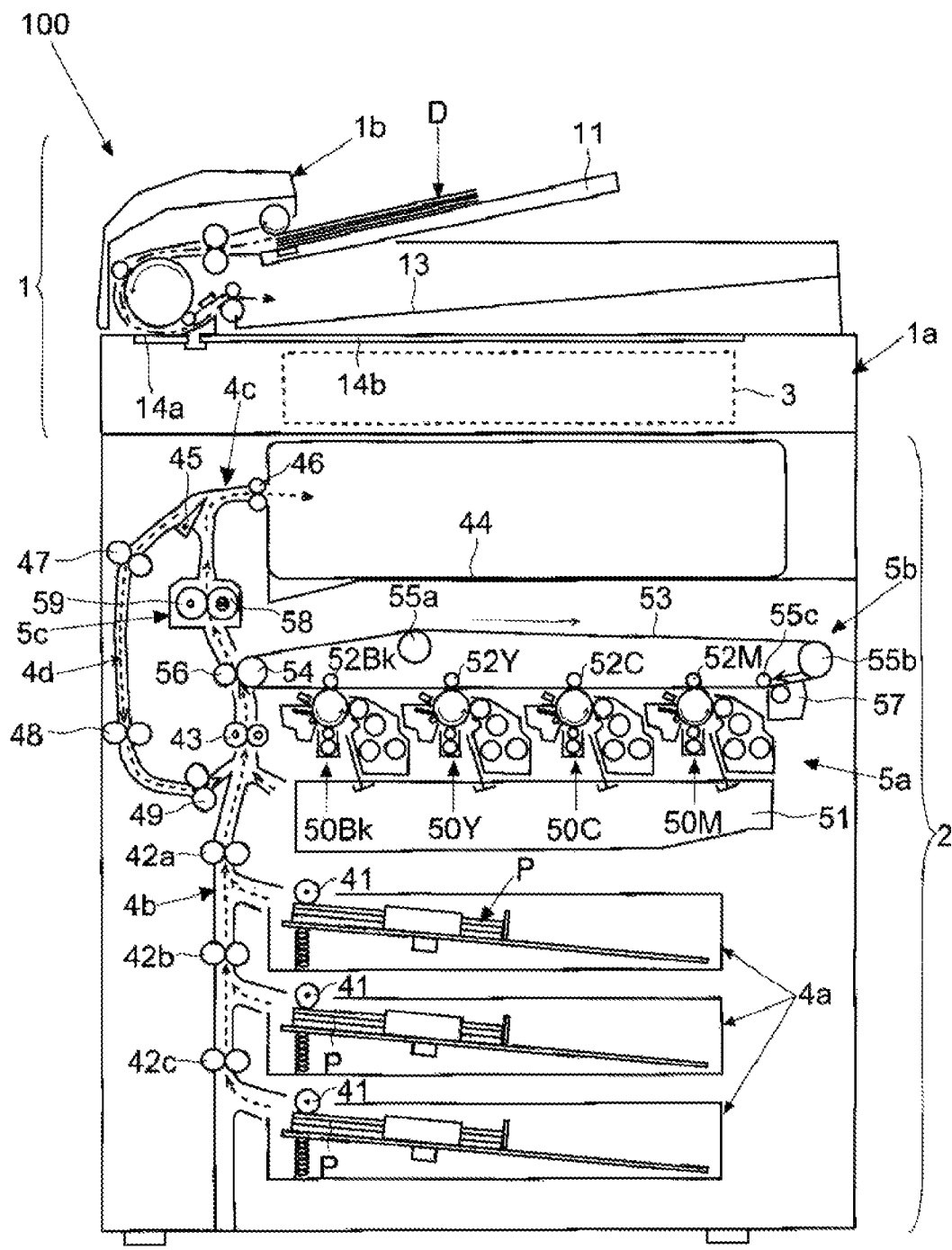
FIG. 1 is a diagram showing a multifunction peripheral according to an embodiment of the present disclosure.

First, with reference to FIG. 1, the summary of the multifunction peripheral 100 according to the embodiment will be described. FIG. 1 is a diagram showing the multifunction peripheral 100.

As shown in FIG. 1, an operation panel 3 (example of operation portion) for performing various settings for the multifunction peripheral 100 is provided forward on the front surface of the multifunction peripheral 100 (the details will be described later). In addition, as shown in FIG. 1, the multifunction peripheral 100 of the present embodiment has, at its upper portion, a document reading portion 1 including an image reading portion 1a and a document conveyance portion 1b. In addition, inside the multifunction peripheral 100, a sheet feed portion 4a, a conveyance portion 4b, an image forming portion 5a, an intermediate transfer portion 5b, a fixing portion 5c, a discharge conveyance portion 4c, and a both-side conveyance portion 4d are included as a printing portion 2.

A plurality of sheet feed portions 4a each accommodate sheets P used in printing. Each sheet feed portion 4a includes a sheet feed roller 41 which is rotationally driven. Upon printing, one of the sheet feed rollers 41 rotates to feed a sheet P one by one to the conveyance portion 4b.

The conveyance portion 4b includes a guide plate for guiding a sheet P, conveying roller pairs 42a, 42b, and 42c which rotate to convey a sheet P, and a registration roller pair 43 which feeds a sheet P in accordance with a timing of transferring a formed toner image.

The image forming portion 5a includes a plurality of image forming units 50 (50Bk for black, 50Y for yellow, 50C for cyan, and 50M for magenta), and an exposure device 51. Each image forming unit 50 includes a photosensitive drum, a charging device, a developing device, a cleaning device, and the like. The exposure device 51 outputs laser light while turning on or off the laser light, based on image data, to scan and expose each photosensitive drum. A toner image is formed on the circumferential surface of the photosensitive drum by each image forming unit 50 and the exposure device 51.

The intermediate transfer portion 5b includes primary transfer rollers 52Bk to 52M, an intermediate transfer belt 53, a drive roller 54, a plurality of driven rollers 55 (55a to 55c), a secondary transfer roller 56, and a belt cleaning device 57. The intermediate transfer belt 53 receives primary transfer of a toner image from each image forming unit 50, and performs secondary transfer onto a sheet.

The fixing portion 5c fixes a toner image transferred onto a sheet P. The fixing portion 5c includes a heating roller 58 having a heat generating body therein, and a pressure roller 59 to be pressed thereto. When a sheet P passes through a nip between the heating roller 58 and the pressure roller 59, toner is melted and heated, whereby a toner image is fixed on the sheet P.

The discharge conveyance portion 4c sorts the sheet conveyance direction of a sheet P discharged from the fixing portion 5c, into a discharge tray 44 direction or a both-side conveyance portion 4d direction. A switch valve 45 is provided for switching the conveyance direction of a sheet P. A discharge roller pair 46 of the discharge conveyance portion 4c is rotationally driven in the forward rotation direction to feed a sheet in the discharge tray 44 direction. In both-side printing, the discharge roller pair 46 switches back a sheet P to guide the sheet P that has been one-side printed into the both-side conveyance portion 4d. Both-side conveying roller pairs 47, 48, and 49 (three pairs in total) of the both-side conveyance portion 4d convey the sheet P that has been one-side printed to upstream of the registration roller pair 43.

(Document Reading Portion 1)

Figure 2:
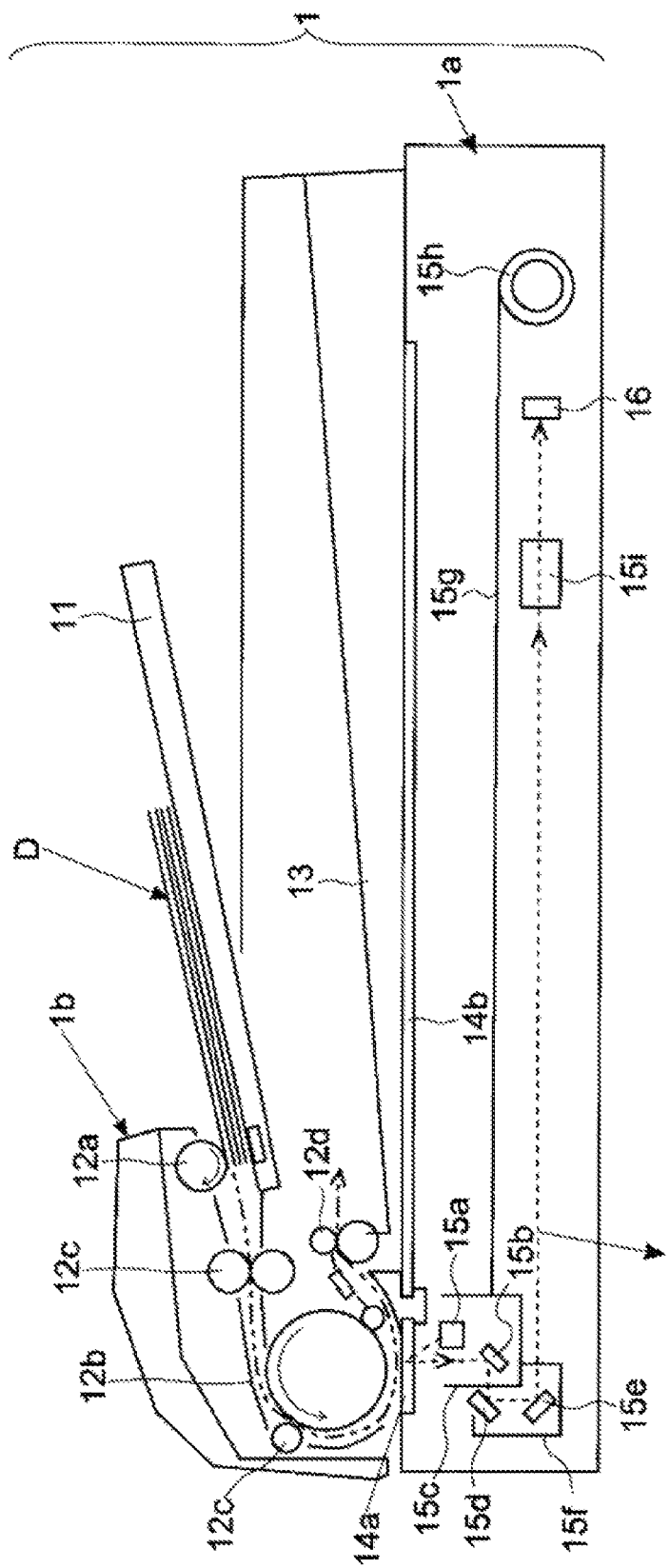
FIG. 2 is a diagram showing a document reading portion of the multifunction peripheral according to the embodiment of the present disclosure.

Next, with reference to FIG. 2, the document reading portion 1 according to the embodiment will be described. FIG. 2 is a diagram showing the document reading portion 1.

The multifunction peripheral 100 of the present embodiment includes the document conveyance portion 1b and the image reading portion 1a as main components for document reading.

The document conveyance portion 1b is provided at an uppermost portion of the multifunction peripheral 100. The document conveyance portion 1b includes, starting from upstream in the document conveyance direction, a document tray 11, a document D feed roller 12a, a document conveyance path 12b, a plurality of document conveying roller pairs 12c, a document discharge roller pair 12d, a document discharge tray 13, and the like. The document conveyance portion 1b automatically and sequentially conveys one by one documents D placed on the document tray 11 to a conveyance reading contact glass 14a (reading position). The document conveyance portion 1b is attached so as to be openable and closable in the up-down direction with respect to the image reading portion 1a, using the far side in the drawing of FIGS. 1 and 2 as a fulcrum, and functions as a board for pushing each contact glass from above.

Next, the image reading portion 1a of the present embodiment will be described. The image reading portion 1a has, on its upper surface, a conveyance reading contact glass 14a for reading a conveyed document D, and a placement reading contact glass 14b for reading a placed document D.

In addition, as shown in FIG. 2, the image reading portion 1a includes, in its housing, optical members such as a first movable frame 15c in which a lamp 15a and a first mirror 15b are attached, a second movable frame 15f in which a second mirror 15d and a third mirror 15e are attached, a wire 15g, a wind-up drum 15h, a lens 15i, and an image sensor 16 which receives light reflected by a document D, reads a document D on a one-line basis, and generates image data. Light emitted from the lamp 15a hits a document D on each contact glass, and the reflected light is reflected by each mirror to be guided into the lens 15i. The lens 15i converges the reflected light onto the image sensor 16.

A plurality of wires 15g are attached to the first movable frame 15c and the second movable frame 15f (in FIG. 2, only one wire is shown for convenience sake). The other ends of the wires 15g are connected to the wind-up drum 15h. The wind-up drum 15h is forward or reversely rotated by a wind-up motor 15m (see FIG. 5), whereby the first movable frame 15c and the second movable frame 15f are freely moved in the horizontal direction.

Upon reading of a document D conveyed by the document conveyance portion 1b, after the wind-up motor 15m is driven, the first movable frame 15c and the second movable frame 15f are fixed at a position (reading position) under the conveyance reading contact glass 14a. Then, the lamp 15a radiates light to the document D that is passing. On the other hand, upon reading of a document D placed on the placement reading contact glass 14b, the first movable frame 15c and the second movable frame 15f are moved from a home position horizontally in the rightward direction in FIG. 2 by the wind-up drum 15*h*, the wires 15*g*, and the like, whereby scan operation is performed sequentially and continuously up to the end of the document.

(Operation Panel 3)

Figure 3:
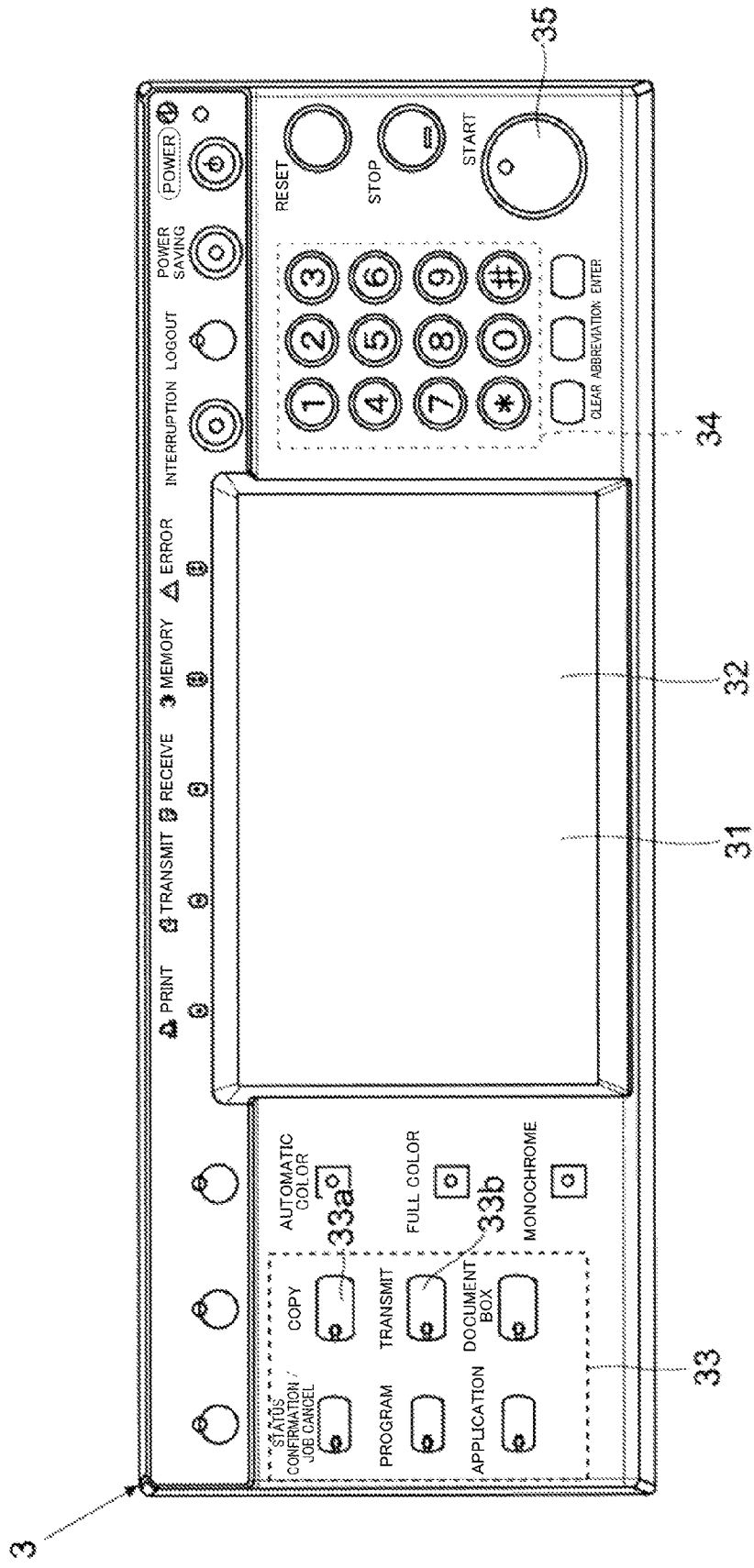
FIG. 3 is a diagram showing an example of an operation panel of the multifunction peripheral according to the embodiment of the present disclosure.

Next, with reference to FIGS. 1 and 3, an example of the operation panel 3 according to the embodiment will be described. FIG. 3 is a diagram showing an example of the operation panel 3.

First, the multifunction peripheral 100 has a plurality of functions such as a copy function (copy job), a transmission function (transmission job) for reading a document D and storing obtained data into any location, and a box function for utilizing image data stored in a storage device 61 (see FIG. 4) of the multifunction peripheral 100. In other words, the multifunction peripheral 100 can execute multiple kinds of jobs.

The operation panel 3 is provided for performing setting of these functions. The operation panel 3 is provided at an upper portion on the front surface of the multifunction peripheral 100 (see FIG. 1). The operation panel 3 includes a function selection key group 33 including hardware keys such as a copy key 33*a* and a transmission key 33*b* for selecting a function to be used. In addition, on the operation panel 3, a numerical keypad portion 34 for numerical input, a start key 35 (example of input portion) for performing instruction to start a job after various settings have been performed, and the like are provided.

In addition, the operation panel 3 includes a display portion 31. Upon use of each function (execution of each job), the display portion 31 displays a screen for selecting a setting item that can be set for each function, a setting screen for a selected setting item, a key for setting a setting value, and the like. For example, the display portion 31 is a display panel such liquid crystal or organic EL. In addition, a touch panel portion 32 is provided on the display portion 31 (an upper surface of the display portion 31). The touch panel portion 32 is capable of detecting a touched position (coordinates) in the area of the display portion 31. Based on output of the touch panel portion 32, an image, a key, or the like displayed at a touched position is recognized, whereby a user's operation is received.

In the multifunction peripheral 100, it is also conceivable that, in order to cause the multifunction peripheral 100 to operate in a mode for suppressing driving sound of the multifunction peripheral 100, a user always needs to perform setting for executing a silent mode. In this case, since printing in the silent mode is not automatically performed and a user needs to perform setting, there is a problem that an operation for performing printing in the silent mode is troublesome. Then, if a user thinks that printing in the silent mode is troublesome, the silent mode is hardly used eventually. In addition, there is a problem that, if a user forgets to perform setting for performing printing in the silent mode, printing is performed in the state where driving sound of the multifunction peripheral 100 is large. Considering the above, the multifunction peripheral 100 automatically determines whether to execute a job at a silent mode speed or execute a job at a normal mode speed so as to shorten a time until job completion, based on whether or not a specific operation has been performed on the operation panel 3 by a user (that is, using a specific operation as a trigger), thus appropriately determining a job execution speed in accordance with the user's intention.

(Hardware Configurations of Multifunction Peripheral 100 and the Like)

Figure 4:
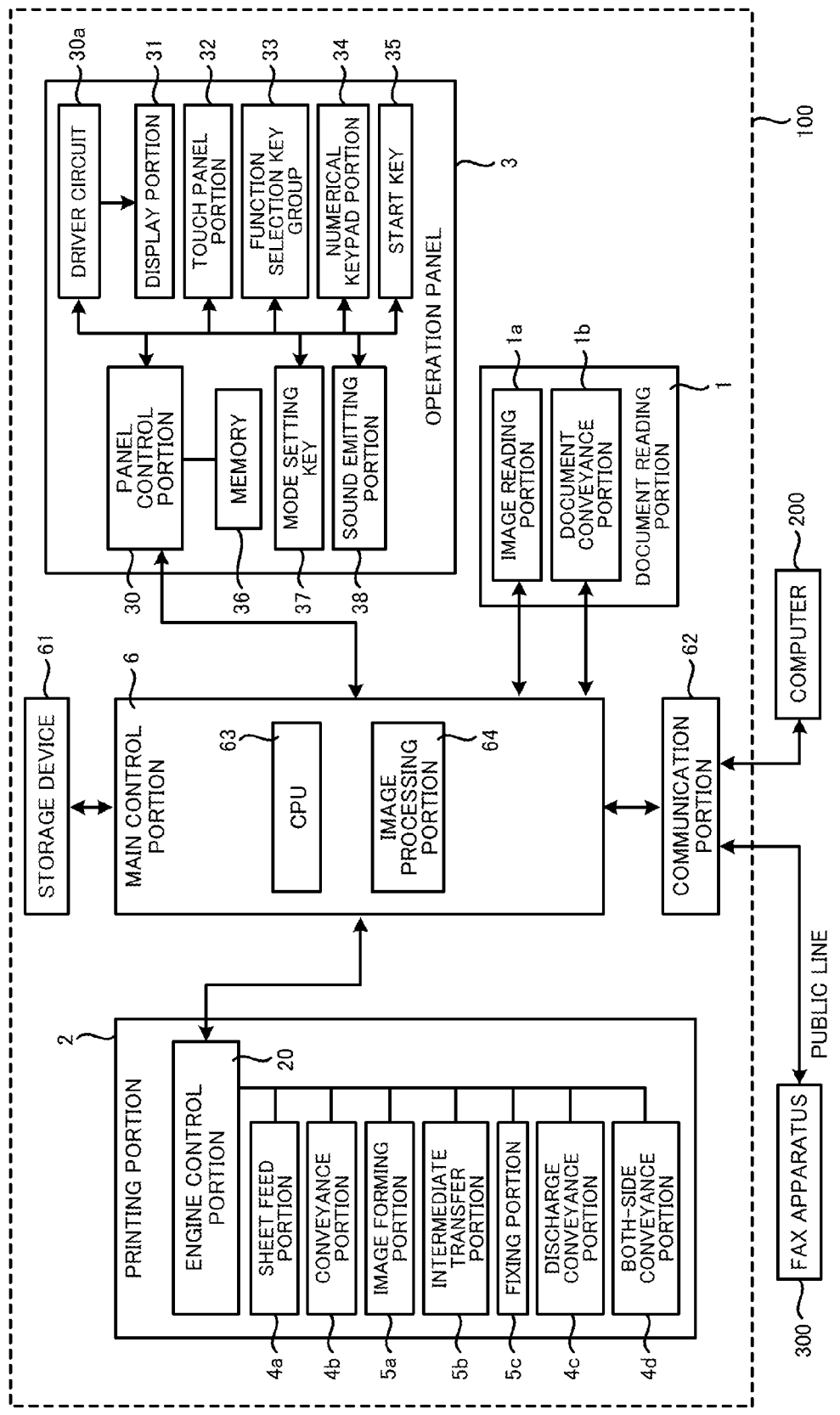
FIG. 4 is a diagram showing the hardware configuration of the multifunction peripheral according to the embodiment of the present disclosure.

Next, with reference to FIG. 4, an example of the hardware configuration of the multifunction peripheral 100 according to the embodiment will be described. FIG. 4 is a diagram showing the hardware configuration of the multifunction peripheral 100.

First, a main control portion 6 is provided. The main control portion 6 is connected to the operation panel 3, the document reading portion 1, the printing portion 2, the storage device 61, a communication portion 62, and the like, and controls the multifunction peripheral 100. A CPU 63 of the main control portion 6 performs processing such as calculation for control. An image processing portion 64 performs image processing in accordance with setting performed on the operation panel 3, for image data obtained by reading a document D or image data received by the communication portion 62, thereby generating image data for printing or transmission.

The storage device 61 is composed of a combination of nonvolatile and volatile storage devices 61 such as a ROM, a RAM, and an HDD, and stores data for control, a program, image data, and data relevant to setting. The main control portion 6 performs control based on the stored content in the storage device 61.

The communication portion 62 communicates with a computer 200 or a FAX apparatus 300 via a network, a communication line, or a cable, based on an instruction from the main control portion 6. The communication portion 62 can transmit image data to the computer 200 or the FAX apparatus 300. In addition, the main control portion 6 can cause the communication portion 62 to receive image data from the computer 200 or the FAX apparatus 300, and cause the printing portion 2 to perform printing based on received image data.

In addition, the main control portion 6 is connected to the document conveyance portion 1*b* and the image reading portion 1*a*, and performs control by giving instructions for their operations. In addition, the main control portion 6 is connected to an engine control portion 20 for controlling the printing portion 2. Based on an instruction from the main control portion 6, the engine control portion 20 controls operations of the sheet feed portion 4*a*, the conveyance portion 4*b*, the image forming portion 5*a*, the intermediate transfer portion 5*b*, the fixing portion 5*c*, the discharge conveyance portion 4*c*, the both-side conveyance portion 4*d*, and the like, thereby causing the printing portion 2 to perform printing.

In addition, the main control portion 6 recognizes an input given to the operation panel 3, and controls the multifunction peripheral 100 so as to perform copy or the like in accordance with user's setting. When, for example, both-side printing is set on the operation panel 3, for example, the main control portion 6 instructs the engine control portion 20 to operate the discharge conveyance portion 4*c* and the both-side conveyance portion 4*d* so as to perform printing on both sides of a sheet P.

The operation panel 3 includes a panel control portion 30, a memory 36 (example of storage portion), a driver circuit 30*a*, the display portion 31, and the touch panel portion 32. The panel control portion 30 is composed of a CPU, an IC, and the like, and controls display of the display portion 31. In addition, the panel control portion 30 receives output from the touch panel portion 32, recognizes a key or an image displayed at a touched position, and recognizes a performed operation.

Image data of a screen and an image to be displayed on the display portion 31 is stored in the memory 36 in the operation panel 3. Therefore, when the display position of any key such as a key for selecting a setting item has been touched, the panel control portion 30 reads out image data of the next screen to be displayed from the memory 36. Then, the panel control portion 30 gives an instruction of the image data to be displayed on the display portion 31, to the driver circuit 30a which actually controls the display portion 31, so as to change the displayed content of the display portion 31 into a state corresponding to the performed operation. It is noted that image data of a screen and an image to be displayed on the display portion 31 may be stored in the storage device 61 on the main body side, and the panel control portion 30 may cause the display portion 31 to perform display based on image data received from the storage device 61.

In addition, the panel control portion 30 is connected to hardware keys such as hardware keys included in the function selection key group 33, the numerical keypad portion 34, or the start key 35. Then, the panel control portion 30 recognizes a hardware key for which a touch operation is performed (pressed).

(Normal Mode and Silent Mode)

Figure 5:
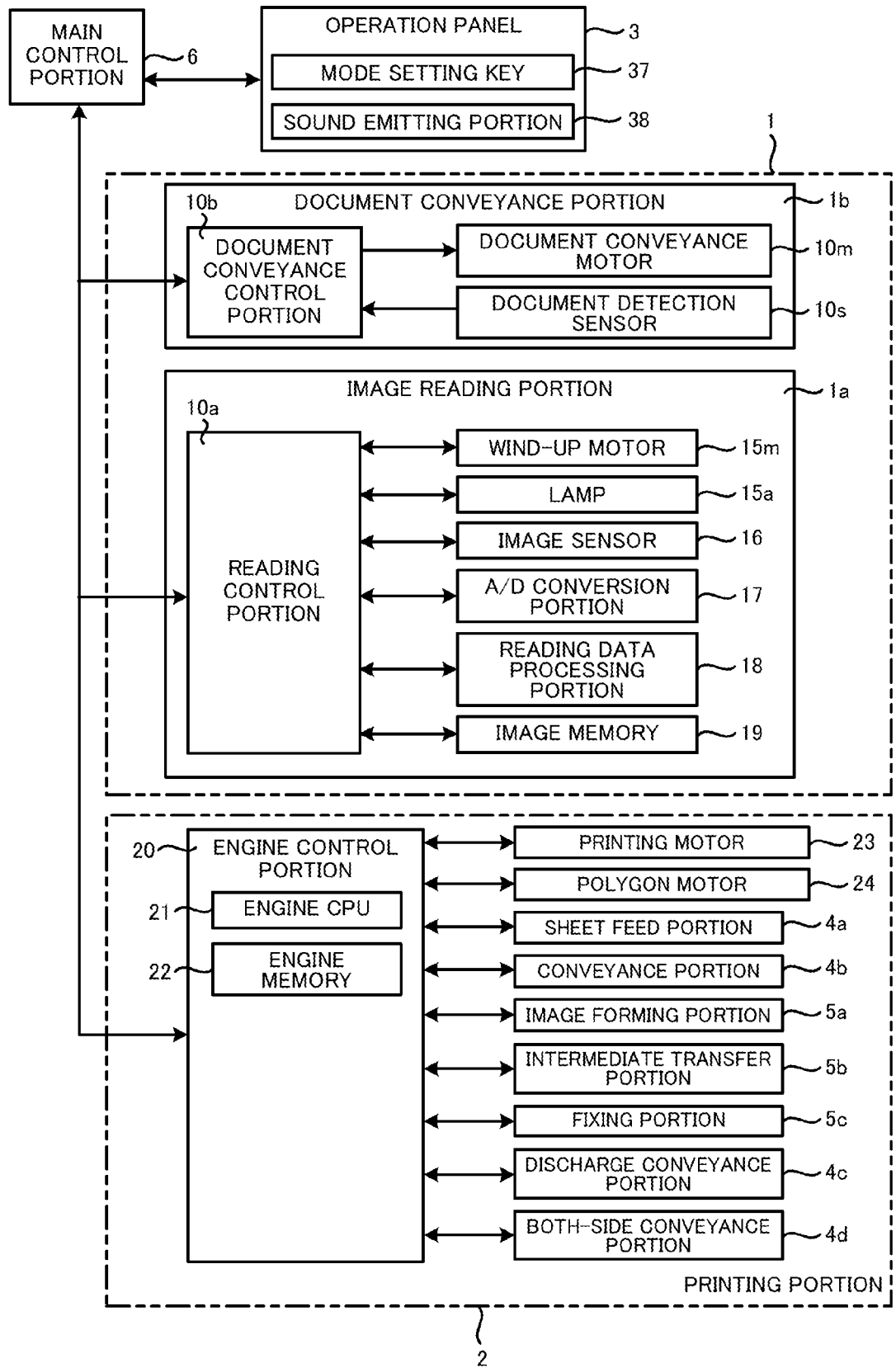
FIG. 5 is a diagram for explaining switching of job execution speed of the multifunction peripheral according to the embodiment of the present disclosure.

Next, with reference to FIG. 5, modes relevant to job execution speed in the multifunction peripheral 100 of the embodiment will be described. FIG. 5 is a diagram for explaining switching of job execution speed.

The multifunction peripheral 100 of the present embodiment has a normal mode in which a job is executed at a normal speed. In addition, the multifunction peripheral 100 has a silent mode in which a job execution speed is set to be slower than in the normal mode and the volume of sound (the level of emitted sound) occurring from the multifunction peripheral 100 along with job execution is suppressed. In the normal mode, a job is executed at a normal job execution speed (for example, a print sheet number or a document reading sheet number per one minute on the specifications) set in advance on the specifications.

In the silent mode, a job execution speed is suppressed. Therefore, it is possible to suppress the magnitude of sound occurring along with job execution in the multifunction peripheral 100, such as feeding sound of a document D or a sheet P, sound of collision of a document D or a sheet P with the conveyance guide, sound caused by friction, rotation sound of each motor, and sound occurring from a rotary body or a mechanical element (a roller and a gear that rotates the roller) that rotates upon job execution. In other words, the silent mode can suppress sound occurring from the multifunction peripheral 100 as compared to the normal mode.

Specifically, the execution speed (hereinafter, "silent mode speed") of a job in the silent mode may be set as appropriate at about ½, ⅓, ¾, ⅔, or ⅗ of the execution speed (hereinafter, "normal mode speed") of a job in the normal mode. In other words, the normal mode speed is faster than the silent mode speed. In the following description, an example where the silent mode speed is ½ (half speed) of the normal mode speed will be described.

An instruction for whether to execute a job in the silent mode or execute a job in the normal mode can be performed on the operation panel 3. Therefore, on the operation panel 3, a mode setting key 37 is provided for determining whether to execute a job in the silent mode or execute a job in the normal mode. The mode setting key 37 may be provided as a hardware key on the operation panel 3, or may be displayed as a software key on the display portion 31.

In addition, in the multifunction peripheral 100 of the present embodiment, whether to execute a job in the silent mode or execute a job in the normal mode is determined based on an operation relevant to a job, performed on the operation panel 3 (based on whether or not a specific operation has been performed) (the details will be described later). Thus, job execution at the silent mode speed is automatically performed without setting by the mode setting key 37.

Next, control for job execution speed will be described. In the multifunction peripheral 100 of the present embodiment, the document conveyance portion 1b of the document reading portion 1 has a document conveyance control portion 10b. The document conveyance control portion 10b controls document conveyance, based on an instruction from the main control portion 6. The document conveyance control portion 10b is a circuit (board) including a CPU, a ROM, a RAM, an IC, and an element.

In a copy job (a job for performing printing using image data based on document reading by the document reading portion 1) or a transmission job (a job for transmitting image data based on document reading by the document reading portion 1 to the computer 200, the FAX apparatus 300, or the storage device 61), the document conveyance control portion 10b conveys one by one documents D placed on the document tray 11. It is noted that in the document reading portion 1, a document detection sensor 10s for detecting whether or not a document D is present on the document tray 11 is provided.

The document conveyance control portion 10b controls a document conveyance motor 10m that rotates a rotary body for conveying a document D placed on the document tray 11. When a job is executed in the silent mode, the document conveyance control portion 10b sets the rotation speed of the document conveyance motor 10m to be slower (about ½) than that when a job is executed in the normal mode. Thus, in the silent mode, the document conveyance control portion 10b conveys a document D at about ½ of the speed in the normal mode.

In addition, in the image reading portion 1a of the document reading portion 1, a reading control portion 10a is provided. The reading control portion 10a controls reading of a document D based on an instruction from the main control portion 6. The reading control portion 10a is a circuit (board) including a CPU, a ROM, a RAM, an IC, and an element.

The reading control portion 10a controls the rotation speed, the rotation direction, and the like of the wind-up motor 15m for moving each movable frame (lamp 15a and each mirror). In addition, the reading control portion 10a controls ON/OFF of the lamp 15a. Upon reading a document D, the reading control portion 10a turns on the lamp 15a, and when the reading has been finished, turns off the lamp 15a. In addition, the reading control portion 10a controls operation of the image sensor 16. In addition, the reading control portion 10a causes an A/D conversion portion 17 to generate image data based on analog output of the image sensor 16. In addition, the reading control portion 10a causes a reading data processing portion 18 to perform image processing for various types of correction and adjustment for image data generated by the A/D conversion portion 17. In addition, the reading control portion 10a causes an image memory 19 to accumulate image data processed by the reading data processing portion 18 and transmit the image data to the main control portion 6, the storage device 61, or the like.

In a copy job or a transmission job, the reading control portion 10a performs reading of a conveyed document D or operates the wind-up motor 15m to read a document D placed on the placement reading contact glass 14b.

When a job accompanied with reading of a document D placed on the placement reading contact glass 14b is executed in the silent mode, the reading control portion 10a sets the rotation speed of the wind-up motor 15m to be slower (about ½) than that when such a job is executed in the normal mode. Thus, in the silent mode, the reading control portion 10a sets the reading speed of a document D at about ½ of the reading speed in the normal mode.

Upon reading a document D in the silent mode, the reading control portion 10a may cause the image sensor 16, the A/D conversion portion 17, the reading data processing portion 18, and the image memory 19 to operate at a slower operation speed (operation clock) than in the normal mode (for example, sets the operation frequency to about ½). Alternatively, the reading control portion 10a may cause the image sensor 16, the A/D conversion portion 17, the reading data processing portion 18, and the image memory 19 to operate at the same speed in both the normal mode and the silent mode. In this case, the line number in the document conveyance direction (sub scanning direction) is more than that at a predetermined reading resolution. Therefore, the reading control portion 10a causes the reading data processing portion 18 to perform thinning processing to remove unnecessary lines.

In addition, the engine control portion 20 is provided in the printing portion 2. The engine control portion 20 controls the printing speed (print sheet number per unit time) based on an instruction from the main control portion 6. The engine control portion 20 is a circuit (board) including an engine CPU 21, an engine memory 22, an IC, and an element.

The engine control portion 20 controls ON/OFF, the rotation speed, and the like of a printing motor 23 provided in the printing portion 2. One or a plurality of printing motors 23 are provided. The printing motor 23 rotates a roller for sheet conveyance used in printing, a rotary body (such as a roller of the intermediate transfer belt 53, the secondary transfer roller 56, or the fixing portion 5c, or a rotary body of the image forming portion 5a) for performing processing relevant to printing while conveying a sheet, and a rotary body to be rotated upon printing such as a rotary body (for example, photosensitive drum) relevant to formation of a toner image. In addition, the engine control portion 20 controls ON/OFF, the rotation speed, and the like of a polygon motor 24 that rotates a polygon mirror in the exposure device 51 for performing scanning and exposure for the photosensitive drum.

In a copy job, a print job for performing printing based on data transmitted from the outside such as the computer 200, and a box print job for performing printing based on image data accumulated in the storage device 61, the engine control portion 20 causes the printing portion 2 to perform printing.

When a job relevant to printing is executed in the silent mode, the engine control portion 20 sets the rotation speed of the printing motor 23 to be slower (about ½) than that when such a job is executed in the normal mode. Thus, in the silent mode, the engine control portion 20 sets the execution speed of a print job at about ½ of the execution speed in the normal mode.

In addition, when scanning and exposure for the photosensitive drum are performed in the silent mode, the engine control portion 20 may make the rotation speed of the polygon motor 24 slower than that in the normal mode (for example, set the frequency of a drive signal inputted to the polygon motor 24 to about ½), along with the rotation speed of the photosensitive drum being made slower than that in the normal mode. Alternatively, in the silent mode, without changing the rotation speed of the polygon motor 24, the engine control portion 20 may perform scanning and exposure for the photosensitive drum at a rate of one line per several lines in accordance with the deceleration rate (for example, perform exposure for only one line per two lines in accordance with image data).

(Normal Operation)

Figure 6:
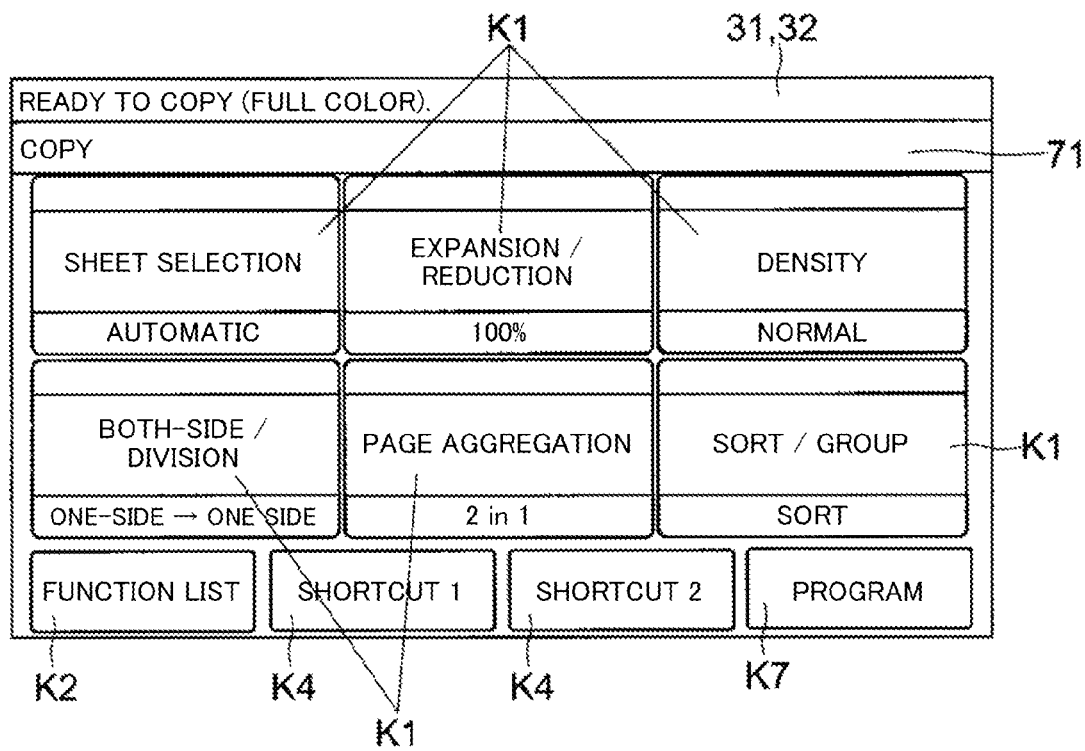
FIG. 6 is a diagram showing an initial screen of a copy function of the multifunction peripheral according to the embodiment of the present disclosure.
Figure 7:
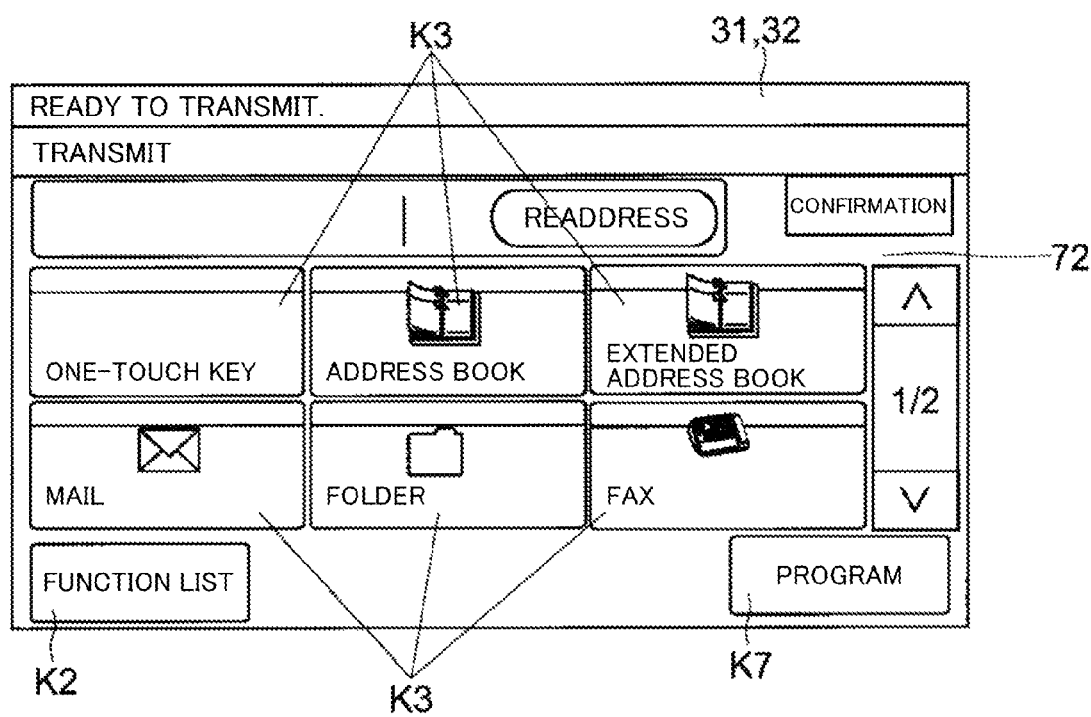
FIG. 7 is a diagram showing an initial screen of a transmission function of the multifunction peripheral according to the embodiment of the present disclosure.

Next, with reference to FIGS. 6 and 7, a normal operation in setting of the multifunction peripheral 100 according to the embodiments will be described. FIG. 6 is a diagram showing an initial screen 71 of a copy function. FIG. 7 is a diagram showing an initial screen 72 of a transmission function. Although initial screens of other functions are also present, the description thereof is omitted.

When the copy key 33a provided as one key in the function selection key group 33 (hardware key) of the operation panel 3 is pressed, the panel control portion 30 displays the initial screen 71 of a copy function. In addition, when the transmission key 33b provided as one key in the function selection key group 33 is pressed, the panel control portion 30 displays the initial screen 72 of a transmission function.

The multifunction peripheral 100 of the present embodiment has various functions (setting items) that can be set. The panel control portion 30 displays, on the display portion 31, keys for selecting a setting item to be set among a plurality of setting items. For example, FIG. 6 shows an example where selection keys K1 for six setting items that are often used are displayed on the initial screen 71 of a copy function. In the case of using another setting item, a user touches the display position of a function list key K2. FIG. 7 shows an example where selection keys K3 for selecting a transmission method are displayed on the initial screen 72 of a transmission function. In the case of selecting another setting item relevant to transmission, a user touches the display position of the function list key K2.

When an operation of selecting a setting item has been performed, the panel control portion 30 of the operation panel 3 displays a setting screen for the selected setting item. A user presses the display position of a key displayed on the setting screen or a hardware key on the operation panel 3, and sets the setting value of the selected setting item. For example, in the case of using a copy function, when, based on a user's operation and output of the touch panel portion 32, the panel control portion 30 has confirmed that a setting item of both-side printing has been selected, the panel control portion 30 displays a setting screen relevant to both-side printing on the display portion 31, and recognizes a setting value relevant to the setting screen of both-side printing.

Thus, normally, in order to select a setting item of a function such as copy or transmission of the multifunction peripheral 100 and set the setting value, a key operation is repeatedly performed from an initial screen on the uppermost layer, one time for each of selection of a setting item and setting of the setting value. Every time one such normal key operation is performed, the panel control portion 30 switches display of the display portion 31 while setting of a setting item is selected and the setting value of a function to be set is set eventually (normal operation). The panel control portion 30 recognizes that this function has been selected and set, and transmits the recognized content to the main control portion 6. Thus, the main control portion 6 causes the document reading portion 1 or the printing portion 2 to perform an operation in which the function selected and set on the operation panel 3 is reflected, thereby obtaining a result of a job in which a user's intension (for example, density setting, expansion/reduction, or the like) is reflected.

(Specific Operation, Shortcut)

Figure 8:
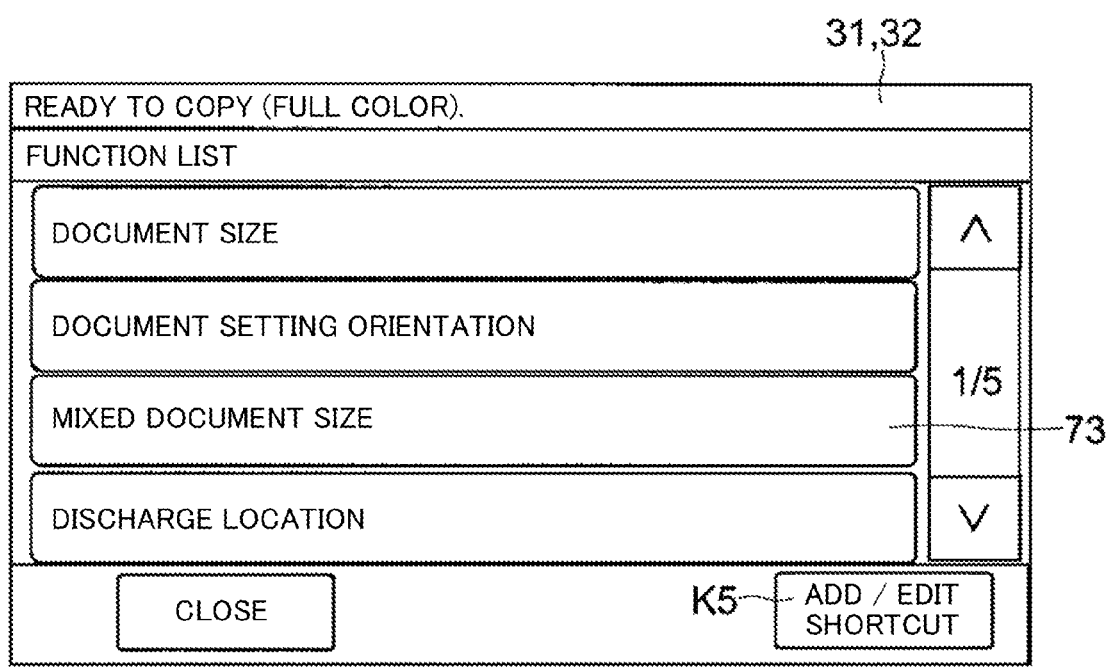
FIG. 8 is a diagram showing a setting item list screen of the multifunction peripheral according to the embodiment of the present disclosure.
Figure 9:
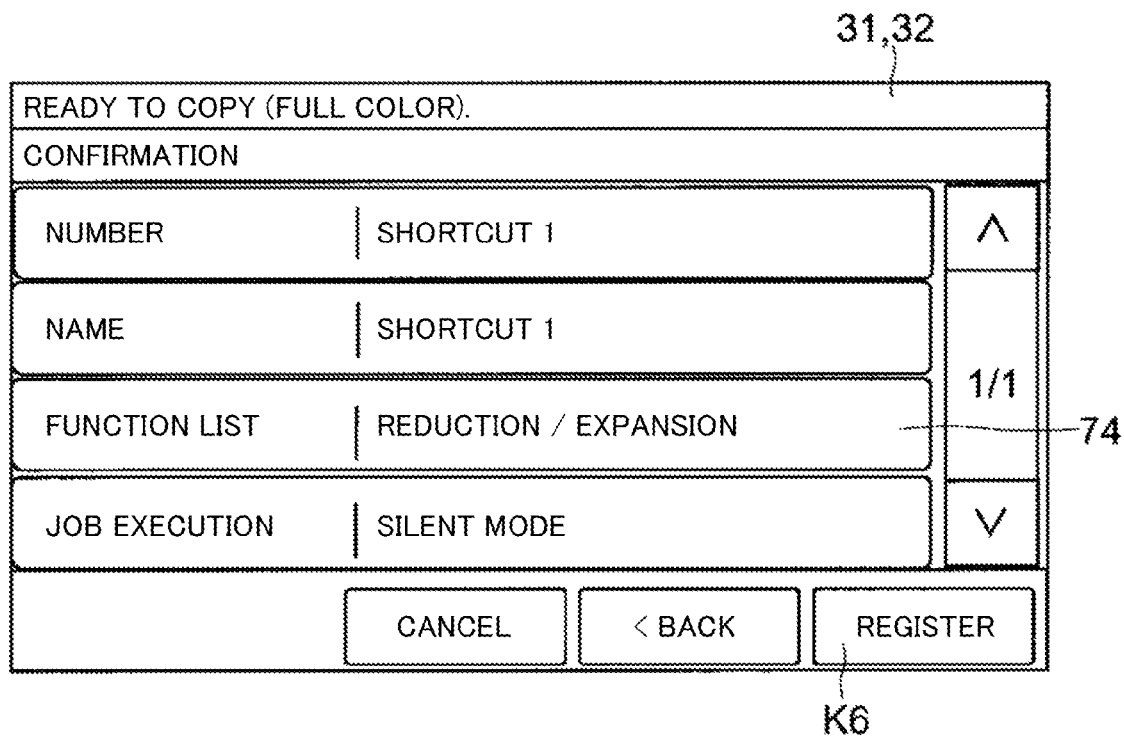
FIG. 9 is a diagram showing a registration screen for edited shortcut of the multifunction peripheral according to the embodiment of the present disclosure.

Next, with reference to FIGS. 8 and 9, shortcut which is one of specific operations will be described. FIG. 8 is a diagram showing a setting item list screen 73. FIG. 9 is a diagram showing an edited shortcut registration screen 74.

Here, specific operations are operations whose contents are registered in advance (stored in the memory 36) and which make the state of the operation panel 3 be a state where a plurality of touch operations have been performed, by one touch operation.

In the multifunction peripheral 100 of the present embodiment, a plurality of setting items are prepared for each function such as copy or transmission. In the multifunction peripheral 100 of the present embodiment, a specific operation of shortcut can be performed. The specific operation of shortcut is an operation of displaying a setting screen for a setting item registered in advance by only performing one touch operation (call operation).

In normal operation, in order to display a desired setting screen, it is necessary to perform a plurality of touch operations (steps) such as an operation of displaying a screen for selecting a setting item, an operation of switching a page of a screen for selecting a setting item, and an operation of selecting a setting item. However, by the specific operation of shortcut, a setting screen can be easily displayed by one touch.

In the case of performing the specific operation of shortcut, a user touches the display position of a shortcut key K4. FIG. 6 shows an example where the panel control portion 30 displays two shortcut keys K4 at lower positions of the initial screen 71 of a copy function on the display portion 31.

The operation panel 3 accepts edit of the content (a setting screen for a setting item to be displayed) of each shortcut key K4. The panel control portion 30 displays a shortcut edit key K5 on the setting item list screen 73 for selecting a setting item or on each setting screen. FIG. 8 shows an example where the shortcut edit key K5 is displayed on the setting item list screen 73 of a copy function.

When the display position of the shortcut edit key K5 has been touched, the panel control portion 30 displays the shortcut registration screen 74 on the display portion 31. The panel control portion 30 (operation panel 3) receives an input performed on the shortcut registration screen 74 to select a setting item for which a setting screen is to be displayed when the shortcut key K4 has been touched or to assign a name to the shortcut key K4.

When the display position of a registration key K6 provided on the shortcut registration screen 74 has been touched, the memory 36 stores the content of setting performed on the shortcut registration screen 74. Hereafter, the panel control portion 30 displays, on the display portion 31, a setting screen associated with the shortcut key K4 whose display position has been touched, based on the content stored in the memory 36.

(Specific Operation, Program)

Figure 10:
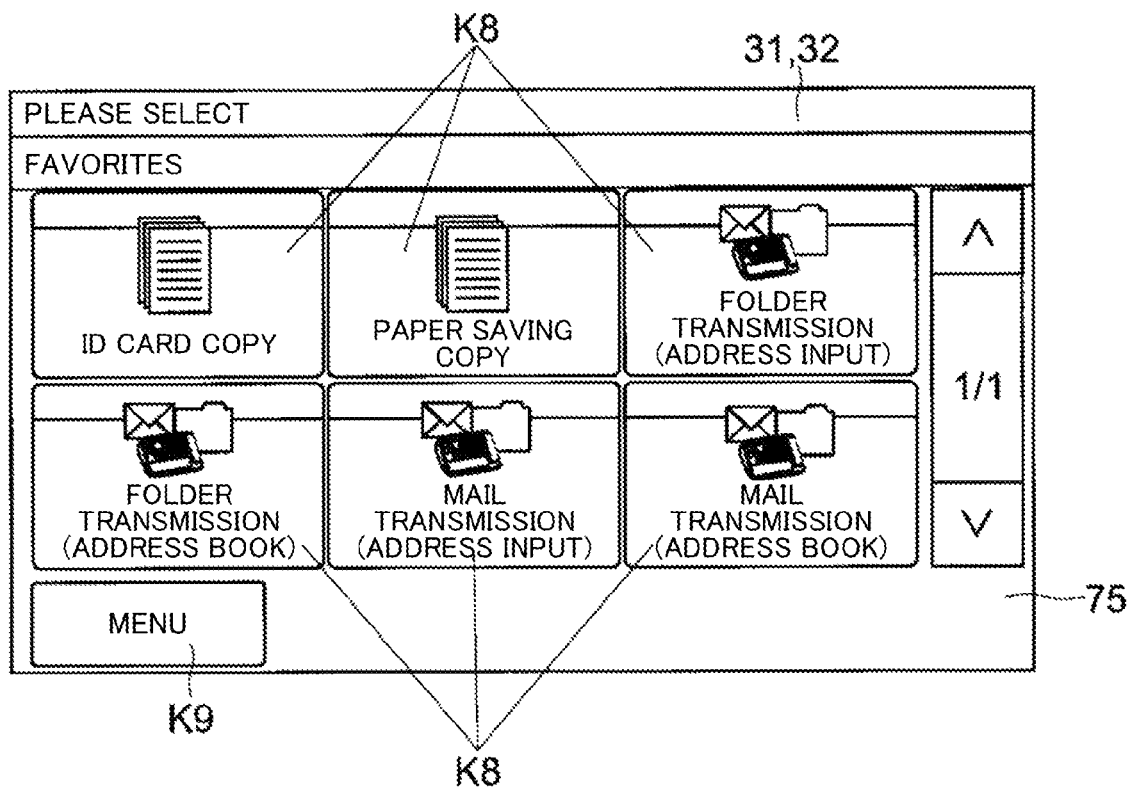
FIG. 10 is a diagram showing a program selection screen of the multifunction peripheral according to the embodiment of the present disclosure.
Figure 11:
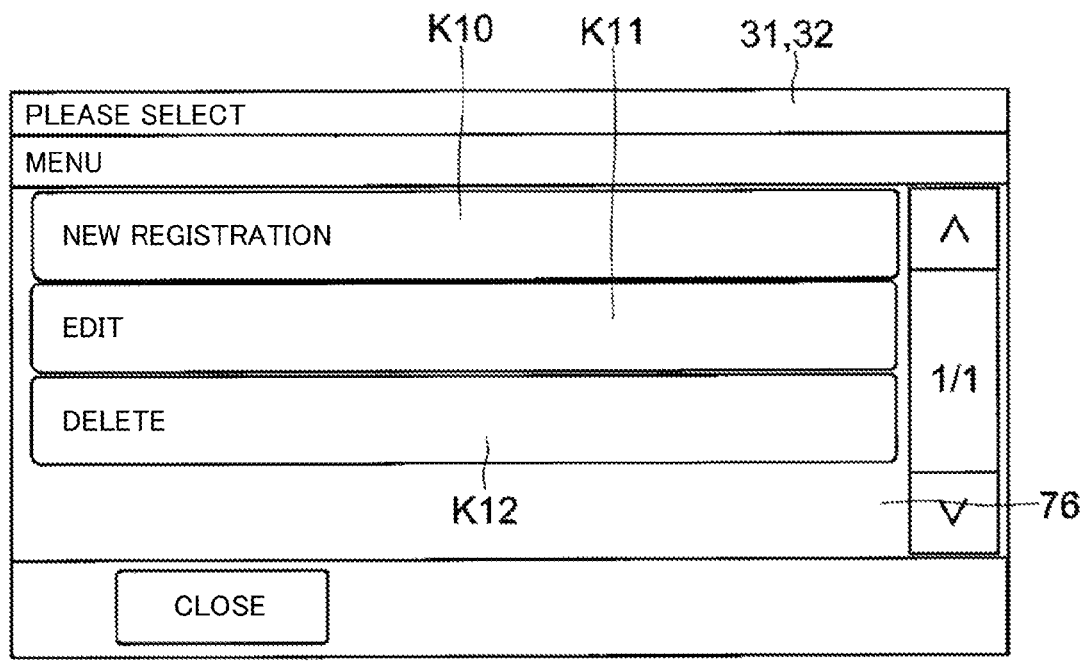
FIG. 11 is a diagram showing a menu screen for program edit of the multifunction peripheral according to the embodiment of the present disclosure.

Next, with reference to FIGS. 6, 7, 10 to 12, a program which is one of the specific operations will be described. FIG. 10 is a diagram showing a program selection screen 75. FIG. 11 is a diagram showing a menu screen 76 for program edit. FIG. 12 is a diagram showing an edit registration screen 77 for program.

In the multifunction peripheral 100 of the present embodiment, a specific operation of program can be performed. The specific operation of program is an operation of making the operation panel 3 into a state where a setting value of a setting item registered (defined) in advance has been set, by only performing one touch of call operation. In the multifunction peripheral 100 of the present embodiment, the specific operation of program can also be registered as an operation for sequentially displaying, in a wizard style, setting screens for a plurality of setting items registered in advance, by only performing one touch of call operation.

In normal operation, in order to obtain the state where setting values have been set for a plurality of setting items, it is necessary to perform a plurality of times a touch operation such as an operation of selecting a setting item or an operation of setting a setting value. However, by the specific operation of program, a setting value of one or a plurality of setting items can be set on the operation panel 3 by one touch.

In order to perform the specific operation of program, a user touches the display position of a program key K7. FIGS. 6 and 7 show examples where the program key K7 is displayed at a lower position.

When the display position of the program key K7 has been touched, the panel control portion 30 displays, on the display portion 31, the program selection screen 75 for selecting a program registered in advance (see FIG. 10). FIG. 10 shows an example where program selection keys K8 (six keys in total) corresponding to the respective programs are displayed on the display portion 31. A user performs an operation on the operation panel 3, to touch the display position of the program selection key K8 corresponding to a program to be called. Thus, on the operation panel 3, a setting value set (defined) in advance by the called program is set, and display set (defined) in advance by the called program is performed.

In addition, the panel control portion 30 recognizes an edit operation for registering the content (a setting item and a setting value to be set when a program is called) of a program, based on output of the touch panel portion 32. The panel control portion 30 displays a program menu key K9 for performing an edit operation on the program selection screen 75. FIG. 10 shows an example where the program menu key K9 is displayed at a lower position of the program selection screen 75.

When the display position of the program menu key K9 has been touched, the panel control portion 30 displays a new registration key K10, an edit key K11, and a delete key K12 on the display portion 31 (see FIG. 11). The new registration key K10 is operated when a program is newly registered. The edit key K11 is operated when the content of a registered program is edited. The delete key K12 is operated when a registered program is deleted.

When the display position of the new registration key K10 has been touched or when the edit key K11 has been touched, the panel control portion 30 displays the edit registration screen 77 for program on the display portion 31. Based on output of the touch panel portion 32, the panel control portion 30 recognizes a user's operation of defining the content of a program such as the kind of a job (e.g., copy or transmission), the name of a program, selection of a setting item, the setting value of a selected setting item (see FIG. 12), and an address, on the edit registration screen 77.

Then, when the display position of a registration key K13 provided on the edit registration screen 77 for program has been touched, the memory 36 stores the content of setting performed on the edit registration screen 77 for program. Hereafter, based on the content stored in the memory 36, the panel control portion 30 makes the operation panel 3 into the state where a setting value set in advance by a program (selected program) corresponding to the program selection key K8 whose display position has been touched has been set.

(Specific Operation, One-Touch)

Figure 13:
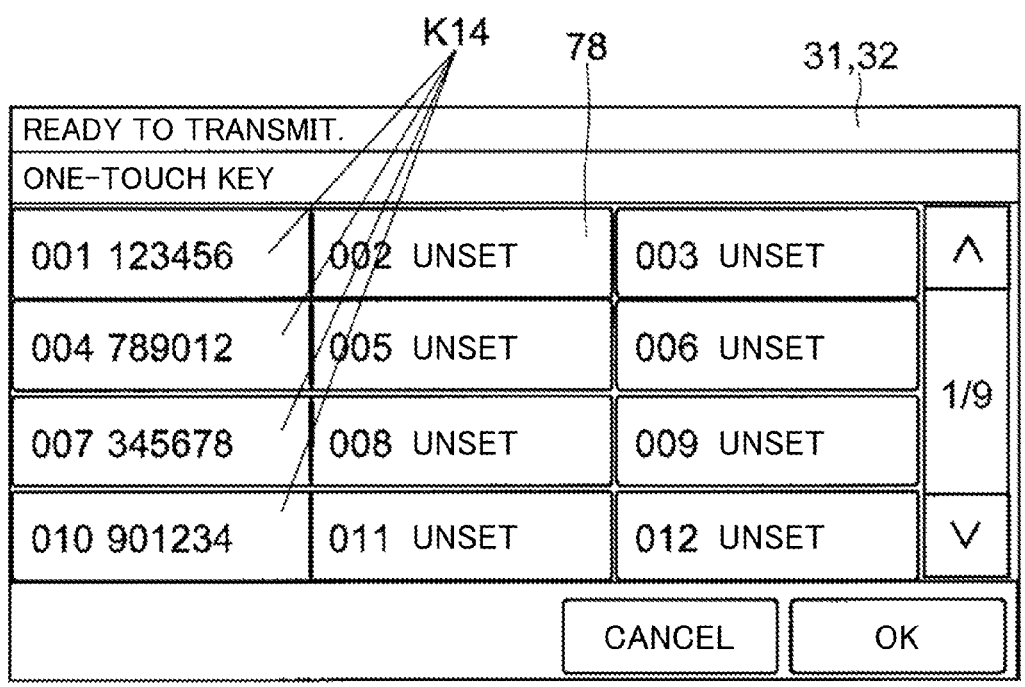
FIG. 13 is a diagram showing a one-touch key list screen of the multifunction peripheral according to the embodiment of the present disclosure.

Next, with reference to FIGS. 7 and 13, one-touch which is one of the specific operations will be described. FIG. 13 is a diagram showing a one-touch key selection screen 78.

In the multifunction peripheral 100 of the present embodiment, a specific operation of one-touch can be performed. The specific operation of one-touch is an operation of obtaining the state where an address of a transmission job registered in advance (transmission destination address, e.g., FAX number, E-mail address, or network address) has been set, by only performing one touch of call operation.

In normal operation, an address is inputted by using the numerical keypad portion 34 or a software keyboard (not shown) displayed on the display portion 31, or an address is selected from an address book by using an address book function which is a database of addresses registered in advance, whereby an address is set. In such a setting method for address, it is necessary to repeat a touch operation a plurality of times. However, if a transmission destination that is often used is registered in advance for the specific operation of one-touch, an address can be set by one touch.

In order to perform the specific operation of one-touch, a user causes the display portion 31 to display the one-touch key selection screen 78. When the display position of the selection key K3 for calling the one-touch key selection screen 78, provided on the initial screen 72 of a transmission function, has been touched, the panel control portion 30 displays the one-touch key selection screen 78 on the display portion 31 (see FIG. 7).

The panel control portion 30 displays a list of one-touch keys K14 registered in advance, on the one-touch key selection screen 78 on the display portion 31 (see FIG. 13). FIG. 13 shows an example where twelve one-touch keys K14 are displayed on one screen. A user touches the display position of an address (one-touch key K14) to be called. Thus, the panel control portion 30 recognizes that setting for performing transmission to the called address has been performed.

In addition, although not shown, the panel control portion 30 (operation panel 3) receives an edit operation for the registered content of one-touch. Based on output of the touch panel portion 32, the panel control portion 30 recognizes a user's operation for defining the content of the specific operation of one-touch such as a transmission destination address or the name of a one-touch key K14.

Then, the memory 36 stores the content of the one-touch. Hereafter, when the one-touch key K14 has been touched, the panel control portion 30 recognizes the address corresponding to the one-touch key K14 whose display position has been touched, as an address of job (image data) transmission, based on the content stored in the memory 36.

In the above example, the case where the one-touch keys K14 are provided as software keys displayed on the display portion 31 has been described. However, a one-touch key K14 may be provided as a hardware key on the operation panel 3.

(Job Execution Speed in Accordance with Whether or not Specific Operation is Performed)

Figure 14:
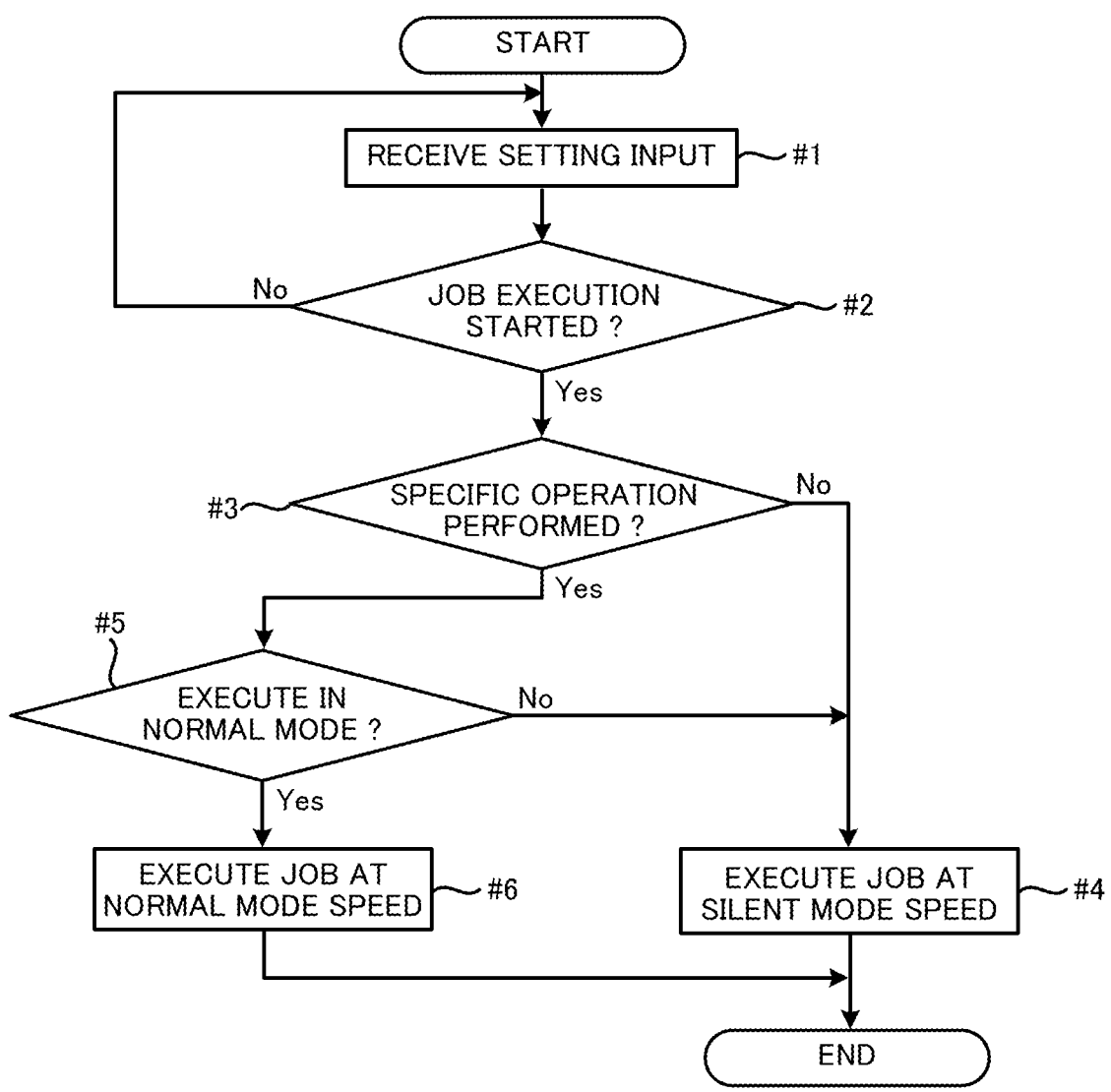
FIG. 14 is a flowchart showing a flow of job execution speed control in accordance with a specific operation of the multifunction peripheral according to the embodiment of the present disclosure.
Figure 15:
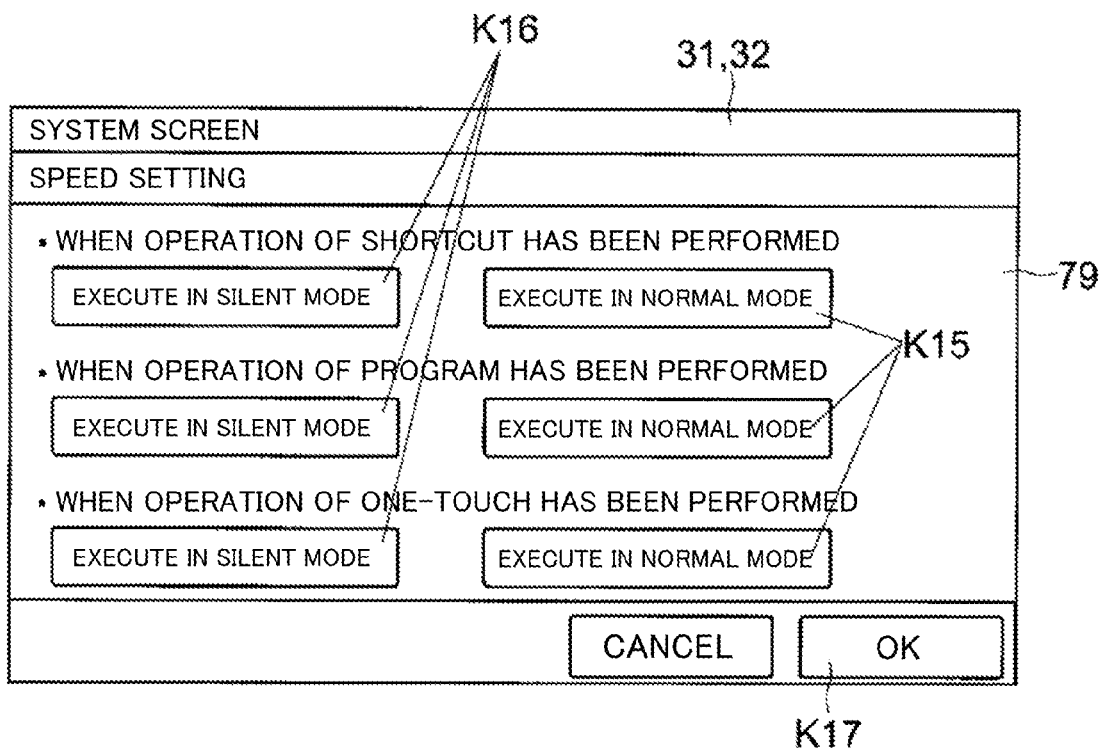
FIG. 15 is a diagram showing a speed setting screen for specific operations of the multifunction peripheral according to the embodiment of the present disclosure.

Next, with reference to FIGS. 14 and 15, a job execution speed in accordance with whether or not a specific operation is performed will be described. FIG. 14 shows a flowchart showing a flow of job execution speed control in accordance with a specific operation. FIG. 15 is a diagram showing a speed setting screen 79 for a specific operation.

In the multifunction peripheral 100 of the present embodiment, the execution speed of a job is changed in accordance with whether or not there is a specific operation for which an execution instruction has been performed by the start key 35. In other words, the main control portion 6 determines whether or not to execute a job by using the silent mode automatically, using a specific operation as a trigger.

With reference to FIG. 14, the flow of control of the job execution speed in accordance with whether or not a specific operation is performed will be described. "START" in FIG. 14 indicates a standby state for receiving job setting by a user after the multifunction peripheral 100 is powered on.

The operation panel 3 (panel control portion 30) receives setting relevant to a job to be executed (step #1). It is noted that the content of a setting input performed by a user is transmitted from the panel control portion 30 to the main control portion 6. Then, the operation panel 3 (panel control portion 30) confirms whether or not an instruction for starting execution of a job has been performed (step #2). The panel control portion 30 confirms that an instruction for starting execution of a job has been performed, when the start key 35 has been pressed or when the display position of a key for performing an instruction for starting execution of a job, displayed on the display portion 31, has been touched.

If an instruction for starting execution of a job has not been performed yet (No in step #2), the operation panel 3 (panel control portion 30) keeps the state for receiving a setting input for a job (returns to step #1).

On the other hand, if an instruction for starting execution has been performed (Yes in step #2), the main control portion 6 confirms whether or not a specific operation has been performed during the setting input for the job (job to be executed) for which the instruction of execution has been performed (step #3). In other words, the main control portion 6 confirms whether or not a specific operation has been performed for the job.

If a specific operation has not been performed but only a normal operation has been performed for the job (No in step #3), the main control portion 6 executes the job at the silent mode speed (step #4). In accordance with the kind of the job, the main control portion 6 causes the document reading portion 1 to perform document reading processing such as document conveyance at the silent mode speed or causes the printing portion 2 to perform print processing such as sheet conveyance and toner image formation.

Then, the flow is ended (END). Then, the main control portion 6 displays an initial screen on the display portion 31, to become the state for receiving next setting of a job. If a user has performed a setting input for a job, the flow is started again from step #1.

If a specific operation has been performed (Yes in step #3), the main control portion 6 confirms whether or not to execute the job at the normal mode speed (step #5).

Here, with reference to FIGS. 9 and 15, setting of the execution speed of a job in the case where a specific operation is performed will be described. FIG. 15 is a diagram showing the speed setting screen 79 for a job to be executed.

In the present embodiment, whether to execute a job at the normal mode speed or execute a job at the silent mode speed when a specific operation has been performed can be set.

Specifically, upon registration of a specific operation, the panel control portion 30 receives speed setting for determining whether to execute a job at the silent mode speed or execute a job at the normal mode speed when the specific operation is performed. Then, when the content of the specific operation is stored into the memory 36, the content of the speed setting is also stored. Thus, speed setting can be performed for each specific operation, and the content of the speed setting is stored for each specific operation. Therefore, the execution speed of a job can be set in accordance with the content and the purpose of each specific operation.

The panel control portion 30 may, not for each specific operation, uniformly receive speed setting for a job in the case where any specific operation is performed. FIG. 15 shows the speed setting screen 79 for receiving speed setting for each kind of specific operation.

On the speed setting screen 79, for each kind of specific operation, a normal mode speed key K15 whose display position is to be touched in the case of executing a job at the normal mode speed when the specific operation has been performed, and a silent mode speed key K16 whose display position is to be touched in the case of executing a job at the silent mode speed when the specific operation has been performed, are provided. By touching the display position of either key, the execution speed of a job in the case where the specific operation is performed can be set. When the display position of an OK key K17 has been touched, the operation panel 3 (panel control portion 30) stores the content of speed setting that has been performed, into the memory 36, the storage device 61, and the like.

Then, based on the speed setting stored in the memory 36, the storage device 61, and the like, the main control portion 6 determines the execution speed of a job for which a specific operation has been performed. In other words, based on the stored speed setting, the main control portion 6 confirms whether to execute a job for which a specific operation has been performed at the silent mode speed or at the normal mode speed.

It is noted that as described with reference to FIG. 9, in the case where speed setting has been also performed in registration of a specific operation, even if uniform setting for job execution speed has been performed by the speed setting screen 79, the main control portion 6 executes a job at a speed based on the speed setting performed in the registration of the specific operation.

If the job is to be executed at the normal mode speed (Yes in step #5), in accordance with the kind of the job, the main control portion 6 causes the document reading portion 1 to perform document reading processing such as document conveyance or causes the printing portion 2 to perform print processing such as sheet conveyance and toner image formation, at the normal mode speed which is faster than the silent mode speed (step #6). Then, the flow is ended (END). On the other hand, if the job is to be executed at the silent mode speed based on speed setting performed in advance even though a specific operation has been performed (No in step #5), the flow shifts to step #4.

(Change of Job Execution Speed)

Next, with reference to FIG. 5, change of job execution speed will be described.

In the multifunction peripheral 100 of the present embodiment, the execution speed of a job is automatically determined based on whether or not a specific operation has been performed. By executing a job at the silent mode speed, the magnitude of sound occurring from the multifunction peripheral 100 can be suppressed.

However, a user in a hurry may desire to execute, at the normal mode speed, a job that is to be executed at the silent mode speed. On the other hand, a user that desires to suppress the magnitude of sound occurring from the multifunction peripheral 100 as much as possible may desire to execute, at the silent mode speed, a job that is to be executed at the normal mode speed.

Therefore, the operation panel 3 receives change of the execution speed of a job for which execution instruction has been performed. The operation panel 3 (panel control portion 30) receives a touch operation on the mode setting key 37 as an instruction for changing the job execution speed. In addition, the panel control portion 30 may display an image for mode switching of a job for which execution instruction has been performed. Specifically, the panel control portion 30 displays, together with a list of jobs that are being executed or waiting for execution, for each job that is being executed or waiting for execution, an image (key or graphic) for selecting whether to execute the job in the silent mode or execute the job in the normal mode, on the display portion 31. Then, when an operation of changing the execution speed such as a touch on the mode setting key 37 or a touch at the display position of an image for mode selection displayed on the display portion 31 has been performed on the operation panel 3, the main control portion 6 changes the execution speed of a job that is being executed or a job that is waiting for execution because a preceding job is being executed, to the silent mode speed if the execution speed is the normal mode speed or to the normal mode speed if the execution speed is the silent mode speed.

Then, upon a job of reading a document D, the main control portion 6 causes the document reading portion 1 to read a document D at the changed job execution speed (normal mode speed or silent mode speed). Upon a job of performing printing, the main control portion 6 causes the printing portion 2 to perform printing at the changed job execution speed (normal mode speed or silent mode speed).

Thus, it is possible to switch the job execution speed determined automatically based on whether or not a specific operation has been performed, to a lower speed or a higher speed later by the time of completion of the job execution after the job execution instruction has been performed. Therefore, a user can execute a job at a desired speed determined later.

(Improvement of Silence Performance)

Next, with reference to FIG. 5, improvement of silence performance will be described.

The multifunction peripheral 100 of the present embodiment can execute a job at the silent mode speed so as not to make a user uncomfortable because of noisy sound. Besides this, processing and operation for reducing discomfort of a user as shown below are performed.

First, the operation panel 3 includes a sound emitting portion 38 which emits operation sound of a touch operation for a software key or a hardware key provided on the operation panel 3 (see FIG. 5). For example, the sound emitting portion 38 is a speaker that emits electronic sound.

While the document reading portion 1 or the printing portion 2 is executing a job, the sound emitting portion 38 sets operation sound to be larger than when a job is not being executed. On the other hand, when the document reading portion 1 or the printing portion 2 is not executing a job, the sound emitting portion 38 sets operation sound to be smaller than when a job is being executed. Thus, when a job is not being executed, the volume of operation sound is suppressed, whereby a user is prevented from feeling discomfort. On the other hand, when a job is being executed, large operation sound is emitted so that the operation sound can be heard so as to stand out, while a user is prevented from feeling that the sound is noisy and feeling discomfort.

When a job is not being executed, there is almost no sound occurring from the image forming apparatus (multifunction peripheral 100), and therefore, operation sound such as electronic sound emitted when the operation portion (operation panel 3) is operated (for example, when some key is pressed) stands out. Therefore, some users may feel that operation sound is noisy when a job is not being executed. On the other hand, it has been experientially found that, when a job is being executed, operation sound does not bother a user very much since the operation sound is hidden by sound occurring from the image forming apparatus (multifunction peripheral 100).

Thus, even in the case where operation sound is emitted, it is possible to make a user feel that sound occurring from the image forming apparatus (multifunction peripheral 100) is silent. In addition, sound of operation for the operation portion (operation panel 3) does not make a person near the image forming apparatus (multifunction peripheral 100) feel discomfort. Further, since operation sound can be easily heard during job execution, a user can easily recognize that the user's operation is successfully received.

In addition, upon job execution, in order to suppress sound occurring from the multifunction peripheral 100, the main control portion 6 makes a timing (time) of starting sheet feed from the sheet feed portion 4a different from a timing (time) of starting feed of a document D from the document conveyance portion 1b. Thus, increase in sound occurring from the multifunction peripheral 100 due to simultaneous feed of a sheet P can be avoided.

That is, when feed of a sheet P used in printing or a document D is started, comparatively large sound is likely to occur due to a factor such as sound of collision of paper with the guide in the conveyance path or rotation start sound of a rotary body performing conveyance. Therefore, occurrence of large sound at two positions in the image forming apparatus (multifunction peripheral 100) at similar times can be avoided, so that an instantaneous maximum volume of sound occurring from the image forming apparatus can be suppressed to be low.

A user may perform a convenient specific operation in order to simplify setting operation and quickly finish the setting, or may register a setting content for a job that is executed periodically or as routine work, and call the setting content by a specific operation. Also, a person may, not in a hurry, perform each step of setting by a normal operation without using a specific operation.

Considering the above, the image forming apparatus (multifunction peripheral 100) of the present embodiment makes the job execution speed different between a job for which a specific operation has been performed on the operation portion during setting operation and a job set by only a normal operation without a specific operation during setting operation on the operation portion.

Thus, whether to execute a job at a high speed or execute a job at a low speed is automatically determined from a user's setting operation for the job, and the job execution speed is automatically changed. In other words, the job execution speed can be automatically switched in accordance with the content of the setting operation performed by the user. In addition, it is possible to execute a job in the silent mode without performing individual operation of indicating job execution in the silent mode in order to suppress sound occurring from the image forming apparatus (multifunction peripheral 100).

A user in a hurry often performs a convenient specific operation in order to simplify setting operation and quickly finish the setting. On the other hand, when a user performs each step of setting by a normal operation without using a specific operation, the user may not be in a hurry. Therefore, the job execution portion (document reading portion 1 and printing portion 2) executes a job for which a specific operation has been performed during setting operation on the operation portion (operation panel 3), at the normal mode speed which is a normal job execution speed, and executes a job set by only a normal operation, at the silent mode speed which is a slower job execution speed than the normal mode speed.

Thus, in the case where it is recognized that a user is in a hurry, a job is executed at a high speed, and in the case where it is recognized that a user is not in a hurry, a job is executed at a low speed. Therefore, the job execution speed can be determined based on accurate determination of whether or not a user is in a hurry. In addition, a job is executed at an appropriate speed that is automatically set, without a user individually setting the job execution speed.

In the case where a setting content of a job that is executed periodically or as routine work is registered and the setting content is called by a specific operation, it may be sometimes sufficient that such a job is executed by a predetermined time. In other words, since the purpose and the content of each specific operation are different, a user may, for some specific operations, permit job execution at a decreased speed. Therefore, for each specific operation, the operation portion (operation panel 3) receives speed setting for setting whether to execute a job at the normal mode speed or execute a job at the silent mode speed, and the storage portion (memory 36) stores the content of speed setting performed on the operation portion, so as to be associated with each specific operation. Then, the job execution portion (document reading portion 1 and printing portion 2) executes, at the normal mode speed, a job for which a specific operation with speed setting that defines job execution at the normal mode speed has been performed and then an execution instruction has been performed, and on the other hand, executes, at the silent mode speed, a job for which a specific operation with speed setting that defines job execution at the silent mode speed has been performed and then an execution instruction has been performed, even though a specific operation has been performed for the job.

Thus, based on user's intension, whether to prioritize reduction of time until completion of job execution or prioritize silence performance while permitting increase in time until completion of job execution, can be determined.

The operation portion (operation panel 3) receives an input for defining the content of a specific operation from a user, and then, when an instruction for registering the content of the specific operation has been performed on the operation portion, the storage portion (memory 36) stores the content of the specific operation defined by the user. Such a specific operation is one or a plurality of an operation of making the operation portion into the state where a predetermined setting value has been set by performing a call operation on the operation portion, an operation of displaying, on the display portion 31 of the operation portion, a setting screen for a predetermined setting item by performing a call operation on the operation portion, and an operation of making the operation portion into the state where an address of a job has been set by performing a call operation on the operation portion. Thus, the job execution speed can be automatically determined in association with each of various kinds of operations.

In the above embodiment, an example where a job for which a specific operation has been performed is executed at a speed corresponding to the speed setting has been described. However, the main control portion 6 may uniformly execute any job for which a specific operation has been performed, at the silent mode speed, and may execute a job set by only a normal operation without a specific operation, at the normal mode speed.

Alternatively, the main control portion 6 may uniformly execute any job for which a specific operation has been performed, at the normal mode speed, and may execute a job set by only a normal operation without a specific operation, at the silent mode speed.

The present disclosure is applicable to an image forming apparatus including an operation portion such as an operation panel, and a job execution portion that performs printing and document reading.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
a job execution portion configured to execute a job;
an operation portion configured to receive an operation of selecting a setting item used in the job to be executed, an operation of setting a setting value of the job to be executed, and an execution instruction for the job; and
a storage portion configured to store a content of a specific operation of making the operation portion into a state where a plurality of touch operations have been performed by one touch operation, wherein
the job execution portion makes a job execution speed different if the specific operation has been performed on the operation portion during a setting operation for the job than if the job has been set by only a normal operation without the specific operation during the setting operation on the operation portion,
the operation portion includes a sound emitting portion configured to emit operation sound of one of the plurality of touch operations on the operation portion, and
the sound emitting portion sets the operation sound when the job execution portion is executing the job, to be larger than when the job execution portion is not executing the job.

2. The image forming apparatus according to claim 1, wherein the job execution portion executes the job at a normal mode speed which is a normal job execution speed if the specific operation has been performed during the setting operation on the operation portion, and executes the job at a silent mode speed which is a slower job execution speed than the normal mode speed if the job has been set by only the normal operation.

3. The image forming apparatus according to claim 2, wherein
the operation portion receives, for each specific operation, a speed setting for setting whether to execute the job at the normal mode speed or execute the job at the silent mode speed,
the storage portion stores a content of the speed setting performed on the operation portion, so as to be associated with each specific operation, and
the job execution portion executes the job at the normal mode speed if which the specific operation with the speed setting that defines execution of the job at the normal mode speed has been performed and then an execution instruction has been performed, and executes the job at the silent mode speed if the specific operation with the speed setting that defines execution of the job at the silent mode speed has been performed and then an execution instruction has been performed, even though the specific operation has been performed.

4. The image forming apparatus according to claim 1, wherein
the operation portion receives a change of an execution speed of the job for which an execution instruction has been performed, and
the job execution portion executes the job at the changed job execution speed.

5. The image forming apparatus according to claim 1, wherein the job execution portion is composed of one or both of a printing portion configured to convey a sheet and perform printing on the sheet, and a document reading portion including a document conveyance portion configured to automatically convey a placed document, the document reading portion being configured to read the conveyed document.

6. The image forming apparatus according to claim 5, wherein
the printing portion includes a sheet feed portion configured to feed a sheet, and
the sheet feed portion and the document conveyance portion respectively start feed of a sheet and feed of a document at different timings.

7. An image forming apparatus comprising:
a job execution portion configured to execute a job;
an operation portion configured to receive an operation of selecting a setting item used in the job to be executed, an operation of setting a setting value of the job to be executed, and an execution instruction for the job; and
a storage portion configured to store a content of a specific operation of making the operation portion into a state where a plurality of touch operations have been performed by one touch operation, wherein
the job execution portion makes a job execution speed different if the specific operation has been performed on the operation portion during a setting operation for the job, than if the job has been set by only a normal operation without the specific operation during the setting operation on the operation portion,
the operation portion receives an input for defining a content of the specific operation from a user,
when an instruction for registering the content of the specific operation has been performed on the operation portion, the storage portion stores the content of the specific operation defined by the user, and
the specific operation is one or a plurality of an operation of making the operation portion into a state where a predetermined setting value has been set by performing a call operation on the operation portion, an operation of displaying on a display portion of the operation portion a setting screen for a predetermined setting item by performing a call operation on the operation portion, and an operation of making the operation portion into a state where an address of the job has been set by performing a call operation on the operation portion.

8. The image forming apparatus according to claim 7, wherein the job execution portion executes the job at a normal mode speed which is a normal job execution speed if the specific operation has been performed during the setting operation on the operation portion, and executes the job at a silent mode speed which is a slower job execution speed than the normal mode speed if the job has been set by only the normal operation.

9. The image forming apparatus according to claim 8, wherein
the operation portion receives, for each specific operation, a speed setting for setting whether to execute the job at the normal mode speed or execute the job at the silent mode speed,
the storage portion stores a content of the speed setting performed on the operation portion, so as to be associated with each specific operation, and
the job execution portion executes the job at the normal speed if the specific operation with the speed setting that defines execution of the job at the normal mode speed has been performed and then an execution instruction has been performed, and executes the job at the silent mode speed if the specific operation with the speed setting that defines execution of the job at the silent mode speed has been performed and then an execution instruction has been performed, even though the specific operation has been performed.

10. The image forming apparatus according to claim 7, wherein
the operation portion receives a change of an execution speed of the job for which an execution instruction has been performed, and
the job execution portion executes the job at the changed job execution speed.

11. The image forming apparatus according to claim 7, wherein the job execution portion is composed of one or both of a printing portion configured to convey a sheet and perform printing on the sheet, and a document reading portion including a document conveyance portion configured to automatically convey a placed document, the document reading portion being configured to read the conveyed document.

12. The image forming apparatus according to claim 11, wherein
- the printing portion includes a sheet feed portion configured to feed a sheet, and
- the sheet feed portion and the document conveyance portion respectively start feed of a sheet and feed of a document at different timings.

\* \* \* \* \*

UNITED STATES PATENT AND TRADEMARK OFFICE
CERTIFICATE OF CORRECTION

| | | |
|---|---|---|
| PATENT NO. | : 9,116,483 B2 | Page 1 of 1 |
| APPLICATION NO. | : 14/254722 | |
| DATED | : August 25, 2015 | |
| INVENTOR(S) | : Ikebata et al. | |

It is certified that error appears in the above-identified patent and that said Letters Patent is hereby corrected as shown below:

In the claims,
Column 19, line 38, claim 3 delete "which".

Signed and Sealed this
Twelfth Day of January, 2016

Michelle K. Lee
*Director of the United States Patent and Trademark Office*